United States Patent [19]

Takeuchi

[11] Patent Number: 4,804,150
[45] Date of Patent: Feb. 14, 1989

[54] APPARATUS FOR MEASURING THE DRAG-FORCE OF A FISHING REEL

[75] Inventor: Shinji Takeuchi, Tokyo, Japan

[73] Assignee: Daiwa Seiko, Inc., Tokyo, Japan

[21] Appl. No.: 79,262

[22] Filed: Jul. 29, 1987

[30] Foreign Application Priority Data

| Jul. 30, 1986 | [JP] | Japan | 61-179035 |
| Aug. 1, 1986 | [JP] | Japan | 61-181459 |
| Nov. 7, 1986 | [JP] | Japan | 61-265274 |
| Mar. 3, 1987 | [JP] | Japan | 62-48364 |
| Mar. 3, 1987 | [JP] | Japan | 62-48366 |
| Mar. 3, 1987 | [JP] | Japan | 62-48367 |

[51] Int. Cl.$^4$ .............. A01K 89/02; B60T 13/04; F16D 55/02
[52] U.S. Cl. .............. 242/84.5 A; 73/862.32; 188/71.2; 188/83; 188/166; 242/84.1 M; 242/217
[58] Field of Search ........ 242/84.2 R, 84.5 A, 242/84.51 A, 84.21 R, 84.5 P, 84.1 M, 217; 188/71.2, 166, 83; 73/862.44, 9, 862.32

[56] References Cited

U.S. PATENT DOCUMENTS

| 2,607,219 | 8/1952 | Millard et al. | 73/862.32 X |
| 3,108,472 | 10/1963 | Scyocurka | 73/862.32 X |
| 3,120,357 | 2/1964 | Wood | 242/84.5 A |
| 3,153,930 | 10/1964 | Jackson | 73/862.32 |
| 3,246,859 | 4/1966 | Martin | 242/217 X |
| 3,255,981 | 6/1966 | Wood | 242/84.5 A |
| 3,364,734 | 1/1968 | Wilson | 73/862.32 X |
| 4,555,072 | 11/1985 | Hitomi | 242/84.5 R |
| 4,650,161 | 3/1987 | Kaneko | 242/84.5 A |
| 4,702,431 | 10/1987 | Kaneko | 242/84.5 A |

Primary Examiner—Joseph J. Hail, III
Attorney, Agent, or Firm—Kalish & Gilster

[57] ABSTRACT

A drag force measuring apparatus for fishing reels wherein a drag device is provided for imparting an undetermined drag force to a fishing-line carrying spool as estimatedly decided by a fisherman based on considerating involving the character of the line, the fishing conditions, etc.; which apparatus includes an adjusting member, a lug relatively rotatable with respect to the adjusting member, and a torque developing agent interconnecting the lug and the member for operation upon turning the lug relative to the member so that maximum rotation of the lug independently of the member will develop a torque equivalent to the imparted drag force, and components for effecting a visual display of the developed torque in terms of a numeric value in a preselected scale.

8 Claims, 15 Drawing Sheets

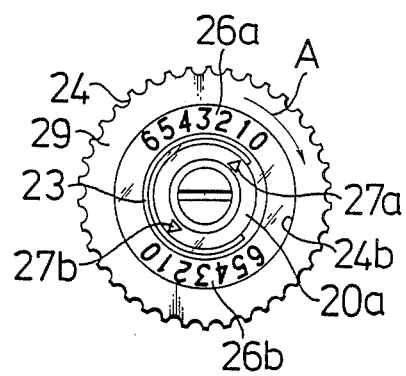
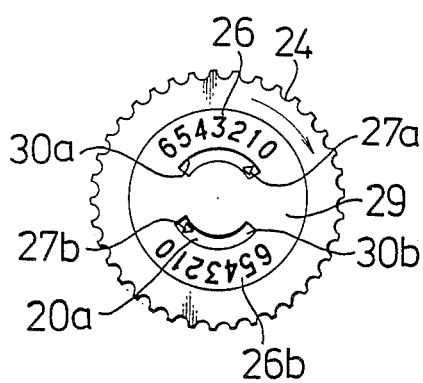
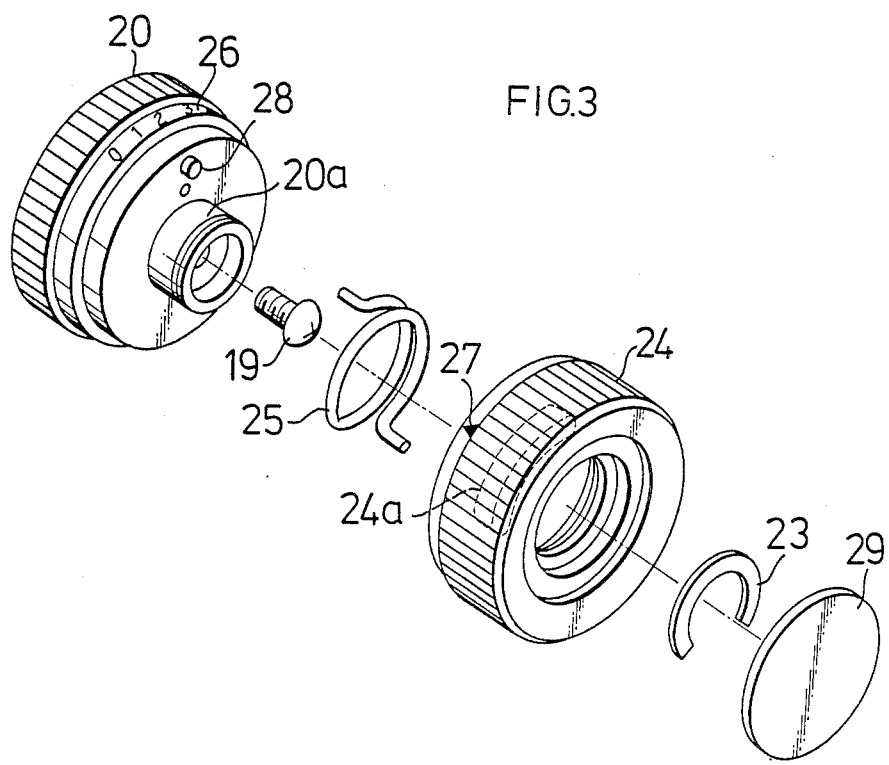

APPARATUS FOR MEASURING THE DRAG-FORCE OF A FISHING REEL

BACKGROUND OF THE INVENTION

1. Field of the Invention

The present invention relates to an apparatus for measuring the drag-force of a fishing reel, and more particularly, to an apparatus capable of measuring the actual drag-force after adjusting the drag-force by manipulating a drag mechanism.

2. Description of the Prior Art

A spinning reel is, in general, equipped with a drag device for preventing a fishing line from being severed because of an intensive pullback by, or violent resisting movements of, the fish. Such drag device is disclosed in the specification of Japanese Utility Model Laid-Open No. 50592/1973.

Generally, such type of drag device is connected to a spool shaft and arranged in such a way that a fastening force, applied to a group of drag washers, is regulated by turning a drag knob in either direction, and the rotational torque, i.e., the drag-force (line feeding force) acting in the direction in which to feed the line from a spool, is adjusted in accordance with the strength of the line wound on the spool.

The above-described drag device of a spinning reel includes a drag-force adjusting knob provided with indicating members and the spool or a reel body which is formed with display graduations. In this construction, the drag-force is indicated by the indicating members on the display graduations. This does not exhibit the actual drag-force but merely exhibits a pressing force of a spring member which is exerted on the group of drag washers as an amount of rotation of the knob. Namely, the indication is nothing but a criterion of the drag-force. It is therefore impossible to know the degree to which the drag-force is actually set. Especially, when the drag washers undergo abrasion or the spring force acting thereon decreases because of fatigue, which cause a change in the relationship between the drag-force and the numeric value indicated by the knob on the graduations. As a result, it is almost impossible to accurately set the desired drag-force. The fisherman sensuously detects the feeding force when paying out the line wound on the spool and then sets the drag-force on the basis of such feeling. As a result, there is produced unevenness in setting the drag-force, and the degree of such depends on whether the fishermen are beginners or well-experienced. Such being the case, there very frequently arises a troublesome problem wherein the line is severed during fishing, because the fastening operation is performed by employing a drag-force greater than the strength of the line.

Accordingly it is a primary object of the present invention, which is made in the light of obviating the above-described problems, to provide drag-force apparatus for a fishing reel which is capable of measuring the actual drag-force after adjusting a drag mechanism thereby facilitating the process of setting a drag-force suited to the employed line and to the fishing conditions.

It is another object of the present invention to provide an actual drag force determining apparatus for fishing reels which may be readily used with, and installed in, fishing reels of all well known types, such as, for example, spinning reels, double bearing reels, closed face reels, single bearing reels, and the like.

It is a futher object of the present invention to provide an actual drag force measuring apparatus for fishing reels having means for displaying a value indicating the determined drag force and wherein such value may be either mechanically or electronically provided.

It is a still futher object of the present invention to provide an apparatus for fishing reels as described which may be equally, easily operated by experienced or beginner fishermen; which is durable and reliable in use; and which permits of display means of multiple chamber commusurate with the reel construction.

BRIEF DESCRIPTION OF THE DRAWINGS

FIG. 3 is an exploded perspective view of the drag measuring apparatus.

FIG. 5 is a front view of another form of drag-force measuring/display unit constructed in accordance with and embodying the present invention.

FIG. 6 is a front view of a further form of a drag-force measuring/display unit.

DESCRIPTION OF THE PRACTICAL EMBODIMENT

Figure 1:
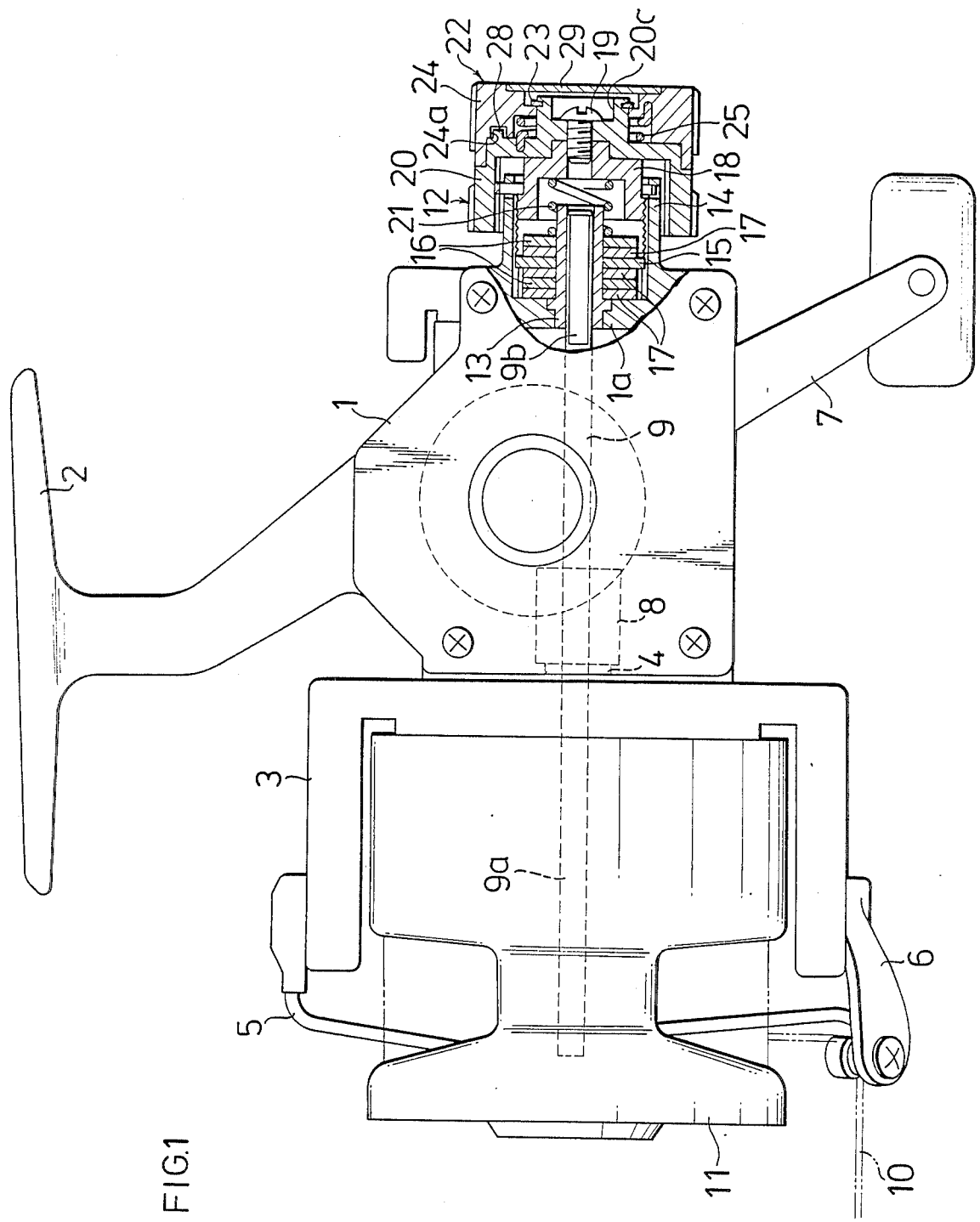
FIG. 1 is a, partially cut away, side view of a first embodiment of the present invention incorporating a spinning reel drag-force measuring apparatus constructed in accordance with and embodying the present invention.

Referring now by reference characters to the drawings which illustrate practical embodiments of the present invention, in FIG. 1, the reference numeral 1 represents a reel body possessed of an installation leg 2; the numeral 3 denotes a rotor rotatably mounted by a conventional shaft 4 to the front portion of reel body 1; 5 designates a bail secured through an arm lever 6 to rotor 3; and 7 designates a handle attached to reel body 1. Handle 7 and supporting shaft 4 of rotor 3 are linked to each other by means of a gear mechanism 8 of a well-known type which is built into reel body 1. In this construction, rotor 3 and bail 5 can be rotated in the line winding direction by turning handle 7. Reference numeral 9 denotes a spool shaft which is rotatably supported on reel body 1 as to be coaxial with supporting shaft 4 of rotor 3 and being axially reciprocable. Spool shaft 9 includes a protruding shaft portion 9a on the side of rotor 3; and a spool 11 wound with a fishing line 10 is fixed to said shaft member 9a.

The numeral 12 designates a drag device mounted to the rear end of the reel body 1. Drag device 12 is rotatably supported o a rear end wall 1a of reel body 1 and is relatively nonrotatable with respect to shaft portion of spool shaft 9. Drag device 12 consists of: a drag shaft 13, rotatably supported on the rear end wall 1a of reel body 1, for receiving said shaft portion 9b such as to be relatively nonrotatable but axially slidable. A plurality of first drag washers 15 which are so fitted to the outer periphery of drag shaft 13 as to be relatively rotatable therewith but engageable in a relatively nonrotatable manner with the inner periphery of a cylindrical member 14 provided at the rear end of reel body 1, coaxial with drag shaft 13; a plurality of second drag washers 16 which are mounted in a relatively nonrotatable manner to the outer periphery of the drag shaft 13 and are in a free state with respect to the inner periphery of cylindrical member 14; a plurality of lining washers 17 interposed between first and second drag washers 15, 16; a drag-force adjusting screw member 18 screwed into an opening formed in cylindrical member 14; an operating knob 20 which is integrally secured to member 18 by a machine screw 19; and a drag-force adjusting coil spring 21 spanned between screw member 18 and laminated washers 15, 16, 17. The spring pressure of the coil spring 21 which acts on the group of washers is varied by turning knob 20 in either direction, thereby adjusting the drag-force relative to spool 11.

In FIG. 1, the numeral 22 indicated a drag-force measuring mechanism carried on knob 20 of drag device 12, which latter is, al illustrated in FIGS. 1 and 3, rotatably mounted on a boss 20 which projects at the center of the end surface of knob 20. Mechanism 22 comprises a drag-force measuring lug 24 which is equivalent to the drag-force set by drag device 12. The ends of a torsion spring 25 are secured to knob 20 and to lug 24. A display graduation 26 for displaying the acutually measured value of the drag-force set by drag device 12 is formed on the outer periphery of knob 20; and an indicating mark 27 confronting display graduation 26 is formed on the outer periphery of lug 24. Numeral 28 indicates a protrusion which is provided on the end surface of knob 20, for engaging an arcuate groove 24a formed in the inner end surface of lug 24. Protrusion 28 and arcuate groove 24a coact to restrict the rotational operating angle of lug 24 within the scope of display graduation 26 and at the same time prescribe a position to which lug 24 is returned by dint of torsion spring 25 so that the indicating mark 27 indicates a value "0" on the display graduation 26. It is to be noted that the numeral 29 designates a mirror plate which covers the end surface opening of the lug 24.

The operations of measuring the drag-force in this first described embodiment is as follows:

Screw member 18 is tightened or slackened to the extent that the fisherman requires by turning adjusting knob 20 of drag device 12 in accordance with the thickness of the fishing line 10 wound on the spool 11 and the fishing conditions. The spring pressure of spring 21 varies in proportion to the degree of threading of screw member 18, and the laminated washers are pressed commensurately with the spring pressure. Consequently, there is created a drag-force which is unknown in terms of numeric value with respect to spool 11.

Figure 2:
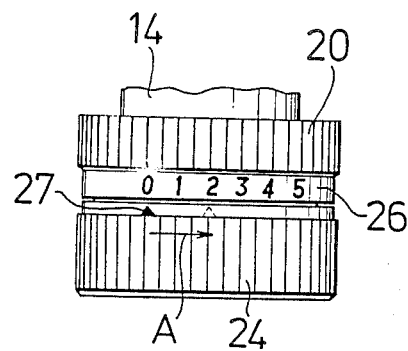
FIG. 2 is a top plan view of the drag measuring apparatus.

Upon completion of the adjusting operation of drag device 12, measuring lug 24, is grasped with the fingers and is then turned in the direction indicated by the arrow A in FIG. 2. Concomitantly, drag-force measuring torsion spring 25 is elastically deformed in the winding direction thereof, whereby the rotary torque acting on lug 24 gradually increases. When the rotary torque produced on account of the elastic deformation of torsion spring 25 is slightly greater than the fastening or tightening torque of knob 20 of drag device 12, knob 20 rotates together with lug 25 in the direction indicated by arrow A. Just when knob 20 begins to interlock with lug 24, that is on its rotation, there may be read a numeric value indicated by the indicating mark 27 on the display graduation 26. This value is the very drag-force which is actually set by the drag device 12 The value is thus obtained.

Figure 4:
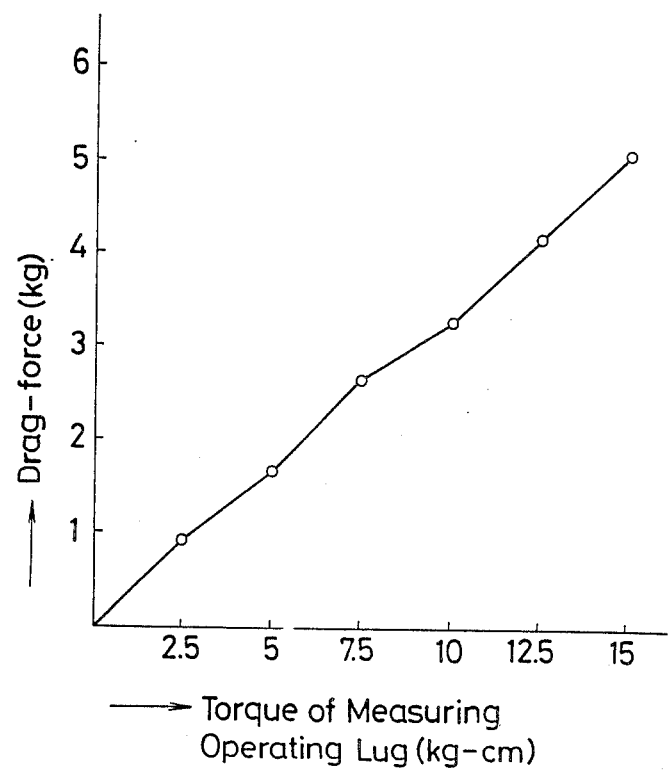
FIG. 4 is a graph showing the relation between the torque of a measuring lug incorporated in the present invention and the drag-force.

FIG. 4 is a graphic chart showing the relation between the torque of the measurement operating lug and the drag-force. As is obvious from the Figure, the line showing the relation between the numeric values of drag-force and the torque of the lug 24 roughly assumes linearity.

It is therefore feasible to accurately recognize whether the set drag-force is suited to the fishing line 10 wound on spool 11 or not by observing the numeric value indicated on the graduation by indicating mark 27 of lug 24. This implies that if the fisherman uses, for instance, a six pound line, knob 20 may be operated so that the drag-force is set to the value "2" on the graduation. With this arrangement, even beginners in fishing are capable of setting the adequate drag-force, and further there is obviated the possibility that the line is severed because of inadequately setting the drag-force. In addition, it is possible to confirm the properties of the drag device 12 by virtue of the actual measurement, and hence a situation of abrasion (lifetime) of the drag washers can exactly be grasped. Furthermore, the maintenance of the drag device is facilitated, and reliability is also improved.

It should be noted that both the adjustment and the measurement of the drag-force can simultaneously be made by manipulating the lug 24.

FIG. 5 illustrates a modification of the mode of displaying the drag-force in the present invention, wherein a pair of indicating marks 27a, 27b are formed with an angular difference of 180° on the end surface of boss 20a of knob 20; and drag-force display graduations 26a, 26b corresponding to the indicating marks 27a, 27b respectively are formed on an installation side step 24b of transparent mirror plate 29 of lug 24. The drag-force can be measured/displayed even in such a display mode as in the case of the above-described first embodiment.

Referring now to FIG. 6, there is shown another modification of the drag-force displaying mode of the present invention. Opaque mirror plate 29 attached to the end surface opening of lug 24 is formed with a pair of arcuate windows 30a, 30b which are aligned with the end surface of inside boss 20a. The drag-force dispaly graduations 26a, 26b are formed outside windows 30a, 30b, and the end surface of boss 20a is provided with the indicating marks 27a, 27b.

Even in such a display mode, it is possible to measure/display the drag-force in a manner similar to that of the above, initially described embodiment.

Figure 7:
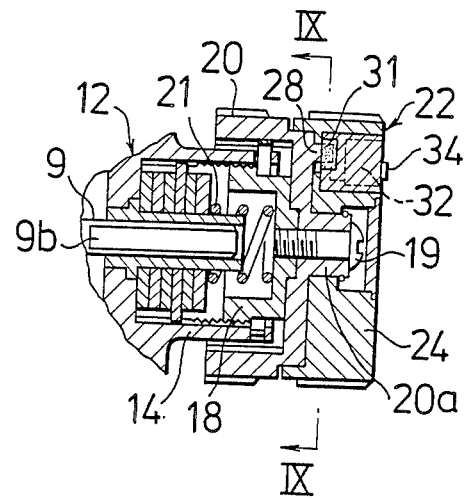
FIG. 7 is a fragmentary vertical sectional view of a drag-force measuring apparatus constructed in accordance with and embodying the present invention.

FIGS. 7 to 10 in combination show a second embodiment of the drag-force measuring apparatus of the present invention. FIG. 7 is a detailed sectional view, wherein the same components as those of FIG. 1 are marked with the same reference characters and the description thereof is hence omitted. The emphasis of the description is placed on the difference from that structure shown in FIG. 1.

Figure 8:
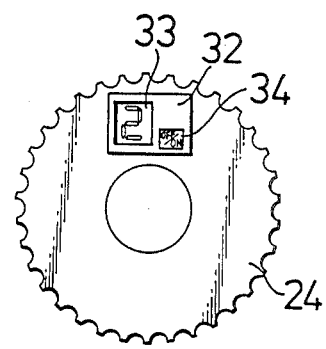
FIG. 8 is a end view of the drag-force measuring apparatus shown in FIG. 7.
Figure 9:
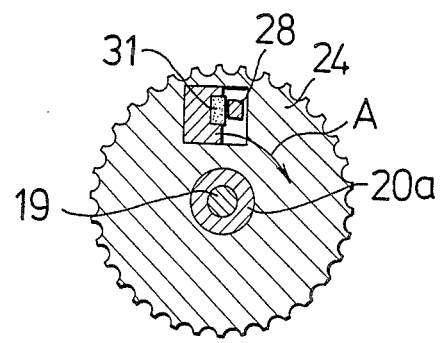
FIG. 9 is a vertical transverse sectional view taken on the line IX—IX of FIG. 7.

In this arrangement, the drag-force is measured by utilizing a pressure sensor 31 instead of the measuring torsion spring. Pressure sensor 31 is provided within drag-force measuring lug 24 which is rotatably fitted on boss 20a of operating knob 20. Pressure sensor 31 is, as depicted in FIG. 9, brought into pressure-contact with protrusion 28 formed on the end surface of operating knob 20 for engagement therewith, when turning operating knob 20 in the fastening direction. Immediately after this step, sensor 31 converts the pressure-contactual force into electric energy and outputs the same A circuit block 32 which is designed for drag-force arithmetic display and includes a battery power supply is incorporated in lug 24. A display unit 33 for displaying the drag-force is, as illustrated in FIG. 8, so provided on the end surface of lug 24 as to be exposed to the outside. Numberal 34 denotes a power supply switch provided on the end surface of the lug 24.

Figure 10:
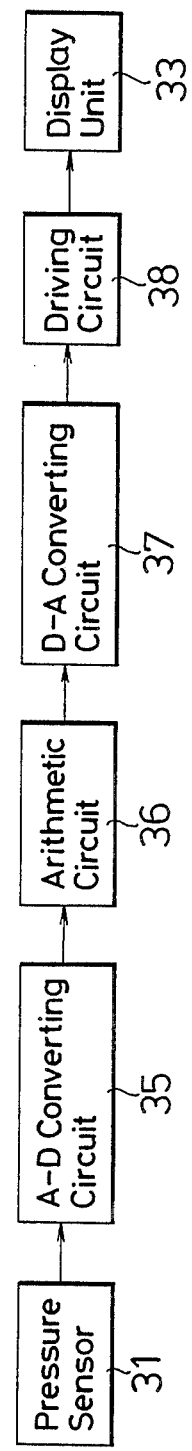
FIG. 10 is a block diagram of the drag-force arithmetic display of the measuring apparatus illustrated in FIG. 7.

FIG. 10 is a block diagram showing an example of the drag-force arithmetic display. Numeral 35 designates an A/D converting circuit for converting an analog signal outputted form the pressure sensor 31 into a digital quantity; 36 represents an arithmetic circuit for computing the drag-force on the basis of the A/D-converted digital signal; 37 indicated a D/A converting circuit for converting the output of the arithmetic result into an analog quantity; and 38 represents a display unit driving circuit which is responsive to the output signal of the D/A converting circuit 36. Display unit 33 is driven by driving circuit 38, whereby the drag-force is numerically displayed.

In the thus constructed drag-force measuring apparatus, when measuring the actual drag-force of drag device 12, power supply switch 34 is first turned on to the ON-side, viz., the rotary force acting in the direction indicated by the arrow A is imparted by operating lug 24 by grasping same with the fingers. Pressure sensor 31 is concomitantly pressingly-engaged with protrusion 28, whereby a voltage corresponding to such pressure is generated in pressure sensor 31. This voltage is converted into the digital quantity by means of the A/D converting circuit 35 and is then outputted to the arithmetic circuit 36, where the arithmetic operation is effected to convert a value of generated voltage of pressure sensor 31 into a drag-force. The arithmetic result is outputted to D/A converting circuit 37 for conversion into an analog quantity. The display unit 33 is made to work by adding this analog signal (voltage) through the driving circuit 38 to said unit 33, whereby the output signal of pressure sensor 31 is numerically displayed.

On the other hand, if the rotary torque provided lug 24 is more than the fastening torque adjusted by operating knob 20, the latter is rotated in the direction indicated by arrow A in such a way that knob 20 is integral with lug 24 through the intermediary of 31. Consequently, if the output signal proportional to the pressure applied to pressure sensor 31 at that moment is displayed on display unit 33 through the indiviaual circuits shown in FIG. 10, the numeric value "2" indicated on diaplay unit 33 is defined as the drag-force which is actually set by drag-device 12. Hence, such displayed value may be recognized as an actually measured value.

The same effects as those of the embodiment of FIG. 1 can be obtained in this embodiment as well. The drag-force also can accurately be measured.

Figure 11:
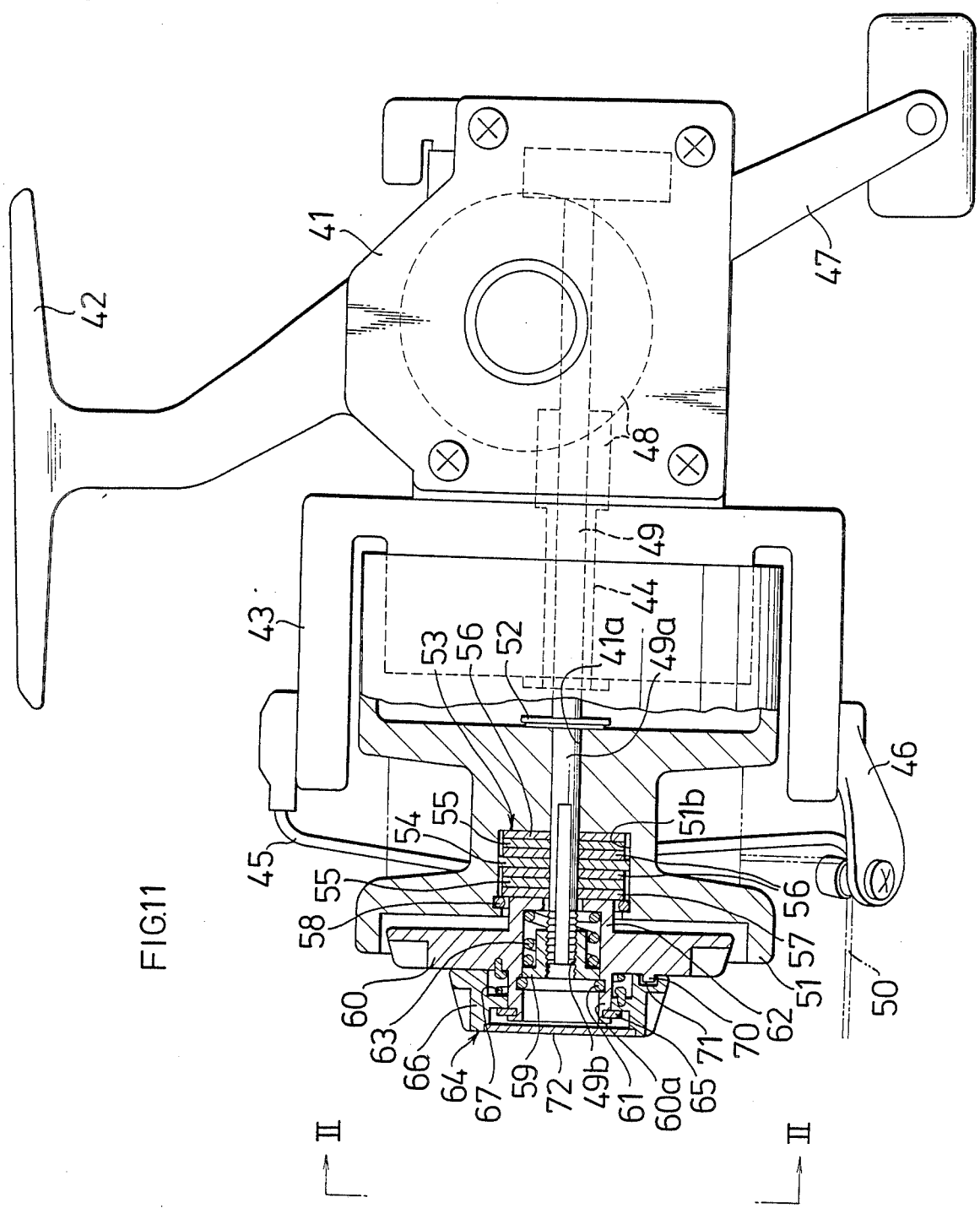
FIG. 11 is a side view, partially in section, of a second embodiment of the present invention incorporating another form of drag-force measuring apparatus constructed in accordance with and embodying the present invention.
Figure 12:
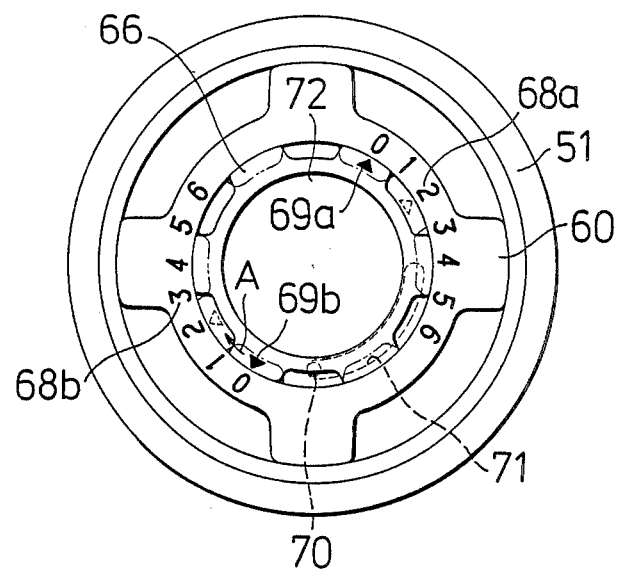
FIG. 12 is an end view taken on the line II—II of FIG. 11.

FIGS. 11 and 12 illustrate another embodiment of the drag-force measuring apparatus of a spinning reel according to the present invention, wherein 41 denotes a reel body including an installation leg 42; 43 designates a rotor which is rotatably mounted on a conventional shaft 44 at the front portion of reel body 41; 45 represents a bail secured through an arm lever 46 to the rotor 43; and 47 indicates a handle attached to the reel body 41. Handle 47 and shaft 44 of rotor 43 are linked to each other by means of a commonly known gear train mechanism 48 provided in reel body 41. In this construction, rotor 43 and bail 45 are rotatable in the line feeding direction of turning handle 47. Numeral 49 designates a spool shaft nonrotatably supported on reel body 41 and being coaxial with supporting shaft 44 of rotor 43 and axially reciprocable therewith. Spool shaft 49 includes a protruding portion 49a disposed on the side of rotor 43, and being fitted with a spool 51 on which a fishing line 50 is wound. Shaft portion 49a extends through spool 51 and is hence coaxial with spool shaft 49. Movement of spool 51 towards rotor 43 is restricted by a receiving member 52 fixed to shaft portion 49a, and in the forward portion of spool 51 a drag device 53 for imparting a drag-force to spool 51 is provided. Drag device 53 consists of: a first drag washer 54 which is in a relatively nonrotatable manner brought into contact with the inner peripheral surface of a cylindrical bore 51b formed in the front portion of spool 51 concentric with a central shaft bore 51a; but being carried on spool shaft 49 in a relatively rotatable manner; a plurality of second drag washers 55 mounted on spool shaft 49 so as to be relatively nonrotatable, but are in a free state with respect to the inner periphery of cylindrical bore 51b; a plurality of lining washers 56 interposed between first and second drag washers 54, 55 and between the second drag washers 55 and the bottom surface of cylindrical bore 51b; and a receiving washer 57 superposed on a lining washer 56 disposed proximate the open end of cylindrical bore 51b. A snap ring 58 maintains the laminated washers against removal; said snap ring 58 engaging with the inner periphery of cylindrical bore 51b. An outer thread 49b is formed on the outer end of shaft portion 49a which juts forwardly and outwardly from cylindrical bore 51b. Outer thread 49b is screwed into a drag-force adjusting nut 59. An adjusting knob 60 is spline-fitted to the outer periphery of nut 59 so that knob 60 is relatively movable thereof. Nut 59 is seized by a snap ring 61 to prevent removal outwardly from adjusting knob 60. The adjusting knob 60 subsumes a cylindrical pressing member 62 which projects on the side of the cylindrical bore 51b of the spool 51 and is in press-contact with the receiving washer 57a among the group of laminated washers. A compression spring 63 employed for adjusting the drag-force spans between the bottom surface of pressing member 62 and adjusting nut 59. In such an arrangement, nut 59 is adjusted in the fastening or tightening and slackening directions by appropriately turning knob 60 for establishing the particular spring pressure to be exerted through pressing member 62 on the group of washers. As a result, the drag-force working spool 51 is adjusted.

In FIG. 11, the numeral 64 designates a drag-force measuring mechanism engaged to adjusting knob 60 of drag device 53. Drag-force measuring mechanism 64 is, as depicted in FIGS. 11, 12, equipped with a drag-force measuring lug 66 which is rotatably fitted to a boss 60a protruding from the center of the outer end surface of adjusting knob 60 and is maintained against removal by a snap ring 65; and with a measuring torsion spring 67 for producing a torque in lug 66 which is equivalent to the drag-force set by drag device 53. The ends of torsion spring 67 are respectively fixed to knob 60 and to lug 66. Display graduations 68a, 68b (FIG. 12) for displaying the actually measured value of the drag-force set by drag device 53 are formed with a phasic difference of 180° on the front end surface of adjusting knob 60. On the front end surface of lug 66 are indicating marks 69a, 69b presented in correspondence to display graduations 68a, 68b, respectively. Numeral 70 represents a protrusion which juts from the front end surface of adjusting knob 60 for engagement within an arcuate groove 71 chased in the inner surface of lug 66. Groove 71 and protrusion 70 coact to restrict the rotational operating angle of lug 66 within the range of formation of display graduations 68a, 68b and further prescribe the position to which lug 66 is caused to revert by dint of torsion spring 67 in such a way that each of the indicating marks 69a, 69b indicates the value "0" on display graduation 68a, 68b. It is to be noted that the numeral 72 denotes a mirror plate for closure of the opening formed in the front end surface of lug 66.

The operation of measuring the drag-force in the above-described embodiment will now be explained: Initially, adjusting knob 60 is rotationally operated, and nut 59 is tightened or slackened, as required, to obtain the drag-force suited to the thickness of line 50 and to the fishing conditions. At this time, the spring pressure of spring 63 varies in proportion to the amount of rotation of nut 59, and further the laminated washers as a whole are pressed through the intermediary of member 62 commensurate with the spring pressure, whereby a drag-force that is unknown in terms of numeric value is imparted to spool 51.

Then, after the adjusting operation of the drag-force of the drag device has been completed, measuring lug 66 is grasped and turned in the direction indicated by the arrow B in FIG. 12. Concomitantly, drag-force measuring torsion spring 67 is elastically deformed in the winding direction, and the rotary torque working on lug 66 is gradually increased. When such rotary torque is slightly greater than the fastening or tightening of knob 60 of drag dvice 53, knob 60 is rotated together with lug 66 in the direction of the arrow A in FIG. 12. Therefore, the particular value that each of indicating marks 69a, 69b indicates on display graduations 68a, 68b respectively may be read at the juncture when knob 60 makes a joint-rotation with the rotary operation of lug 66. This particular value is the very drag-force which is acutally adjusted by drag device 53. The value of the drag-force can thus be obtained.

A graph showing the relation between the torque of the lug designed for the measuring operation and the drag-force on the basis of the actually measured values in this embodiment is identical with that of FIG. 4. As can be clarified from such graph, the line formed by the numeric value exhibiting the drag-force and by the torque of lug 66 roughly assumes linearity. It is therefore feasible to know precisely whether the drag-force that has been set after the adjustment process is suited to the fishing line 50 and to the fishing conditions or not by merely observing the numeric value indicated by each of the indicating marks 69a, 69b of lug 66 on the respective graduations. This implies that if the fisherman employs, for instance, a six pound line, knob 60 may be adjusted so that the drag-force is set to the value "2" on the graduations. With this arrangement, even beginners in fishing are capable of properly setting the drag-force, and it is further possible to prevent the occurrence of such difficulties, as line severance because of inadequate setting of the drag-force. In as mush as the properties of drag device 53 can be confirmed on the basis of actual measurement, a situation of abrasion (lifetime) of the drag washers or the like can exactly be signalled, and the maintenance of the drag device is facilitated. Hence, reliability is substantially improved.

In addition, both the adjustment an the measurement of the drag-force can simultaneously be made by operating lug 66 alone.

Figure 13:
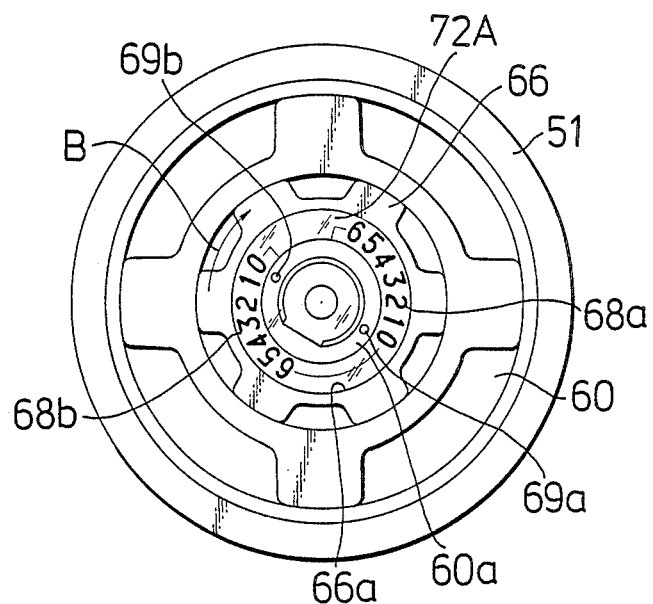
FIG. 13 is an end view of another form of drag-force measuring/display unit of the embodiment illustrated in FIG. 12.

FIG. 13 shows another form of the drag force displaying mode wherein a pair of indicating marks 69a, 69b are formed with an angular difference of 180° on the end surface of the boss 60a of adjusting knob 60; and the drag-force display graduations 68a, 68b corresponding to the indicating marks 69a, 69b are formed on an installation side step surface 66a of a transparent mirror plate 72A on lug 66. Even in such a display mode, the drag-force can be measured and displayed as in the case of the above-described embodiment.

Figure 14:
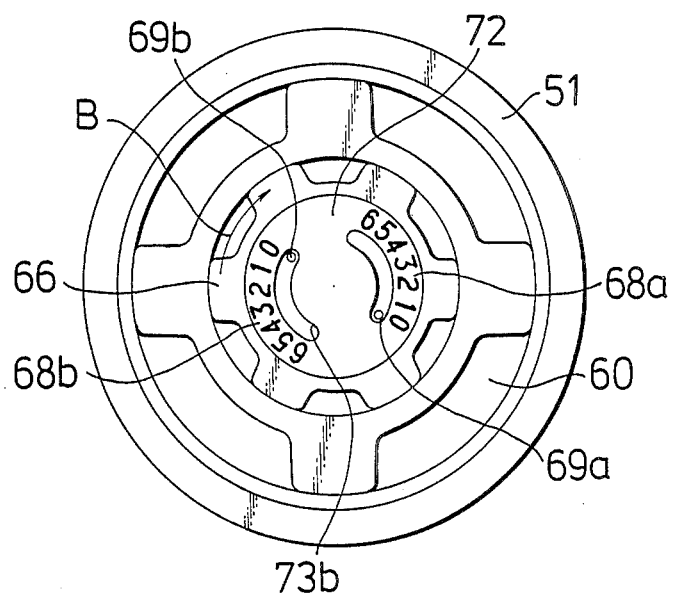
FIG. 14 is an end view showing a further embodiment of a drag-force measuring/display unit of the embodiment illustrated in FIG. 12.

FIG. 14 shows still another form of the drag-force displaying mode wherein a pair of arcuate windows 73a, 73b are formed in an opaque mirror plate 72 attached to the end surface opening of lug 66, in confrontation with the end surface of inside boss 60a; the drag-force display graduations 68a, 68b are formed outside windows 73a, 73b respectively; and the graduation indicating marks 69a, 69b are formed on the end surface of boss 60a. This type of displaying mode permits the measurement/display of the drag-force in a manner similar to that of the preceding described modification.

Figure 15:
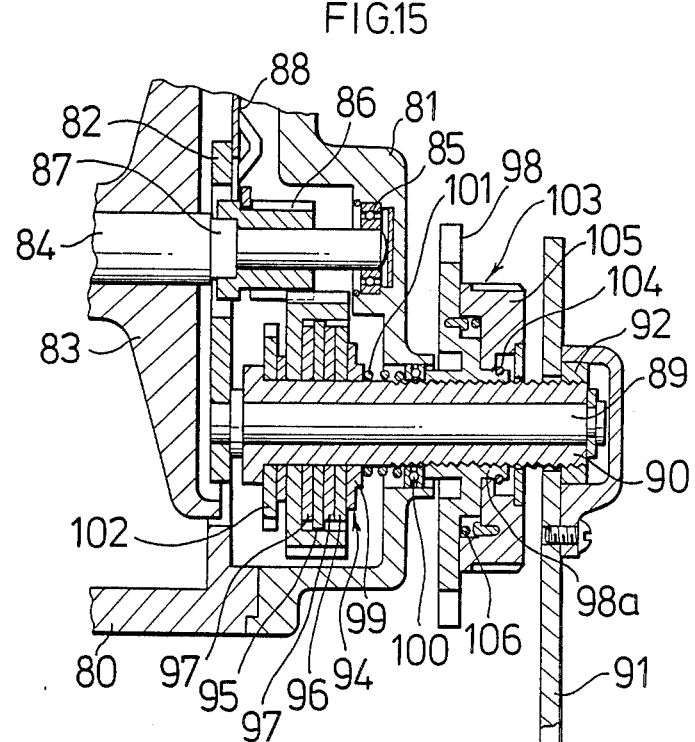
FIG. 15 is a fragmentary sectional view of a fishing reel incorporating a third embodiment of the present invention wherein the drag-force measuring apparatus is applied to a double bearing type.

Referring now to FIG. 15 which illustrates the principal portion of a third embodiment of the present invention wherein the drag-force measuring apparatus is applied to a double bearing type reel, the numeral 80 indicated a reel frame body; 81 represents a right side plate fixed to the side portion of reel frame body 80; and 82 designates a set plate which is integrally secured to the inside of right side plate 81. Numeral 83 indicates a spool. A spool shaft 84 which in one end portion penetrates the axial core of spool 83 is rotatably supported in its other end portion on right side plate 81 by means of a bearing 85. A pinion gear 86 is provided on shaft 84 for relative rotatability and axial slideability, thereon. One end of gear 86 is adapted for engagement with, and disengagement from, a clutch 87 secured to spool shaft 84. The numeral 88 denotes a control panel for causing pinion gear 86 to engage with, and disengage from, clutch 87.

Numeral 89 represents a shaft one end of which is fixed to set-plate 82 and with the other end thereof extending through right side plate 81 and projecting outwardly therefrom. A hollow driving shaft 90 is rotatably fitted to shaft 89. A handle 91 is secured to a outer protruding end of driving shaft 90 with a nut 92. A drive gear 93 which is in mesh with pinion gear 86 is installed to the driving shaft 90 in the relatively rotatable manner. The drive gear 93 is frictionally linked to driving shaft 90 by means of a drag device 94 which includes: a first drag washer 95 which is relatively rotatable with respect to driving shaft 90 but is nonrotatable with respect to drive gear 93; a second drag washer 96 which is relatively nonrotatable with respect to driving shaft 90 but is relatively rotatable with respect to the drive gear 93; a lining washer 97 interposed between drag washers 95, 96 and drive gear 93; a drag-force adjusting knob 98 which is threadedly engaged to driving shaft 90; and a drag-force adjusting spring 101 located between a drag force adjusting knob 98 and drag washer 96 through intermediary of a pressing member 99 and a radial bearing 100. The numeral 102 indicates a ratchet wheel for preventing reverse rotation of the spool attached to driving shaft 90; and a pawl member (not shown) is manually engageable with, and disengageable from, ratchet wheel 102.

The numeral 103 designates a drag-force measuring mechanism which is equipped with a drag-force measuring lug 105 rotatably provided on a boss 98a projecting from the center of the end surface of knob 98 and maintained against removal by means of a snap ring 104; there being a measuring torsion spring 106 for producing the torque in lug 105 which is equivalent to the drag-force adjusted by drag device 94. The opposite ends of torsion spring 106 are connected to knob 98 and lug 105, respectively. Knob 98 and lug 105 are respectively formed with such display graduations and indicating marks as depicted in FIG. 12 in connection with the second embodiment of the present invention.

In order to measure the drag-force exerted on the spool 83, measuring lug 105 is, for example, turned clockwise. Torsion spring 106 is elastically deformed in the winding direction, and at the same instant the spring pressure thereof increases, whereby the rotary torque so generated is slightly greater than the fastening torque of knob 98, the latter is rotated together with lug 105 in the same direction. Consequently, the value that the indicating mark indicates on the graduations may be read just when knob 98 begins to effect a joint-rotation with the rotary operation of lug 105. This value is the actual drag-force set by drag device 94. The drag-force can thus be recognized in terms of a numeric value. As described above, the double bearing type reel permits the setting of the drag-force appropriate to the line and to the fishing conditions as in the case of the spinning reel.

Figure 16:
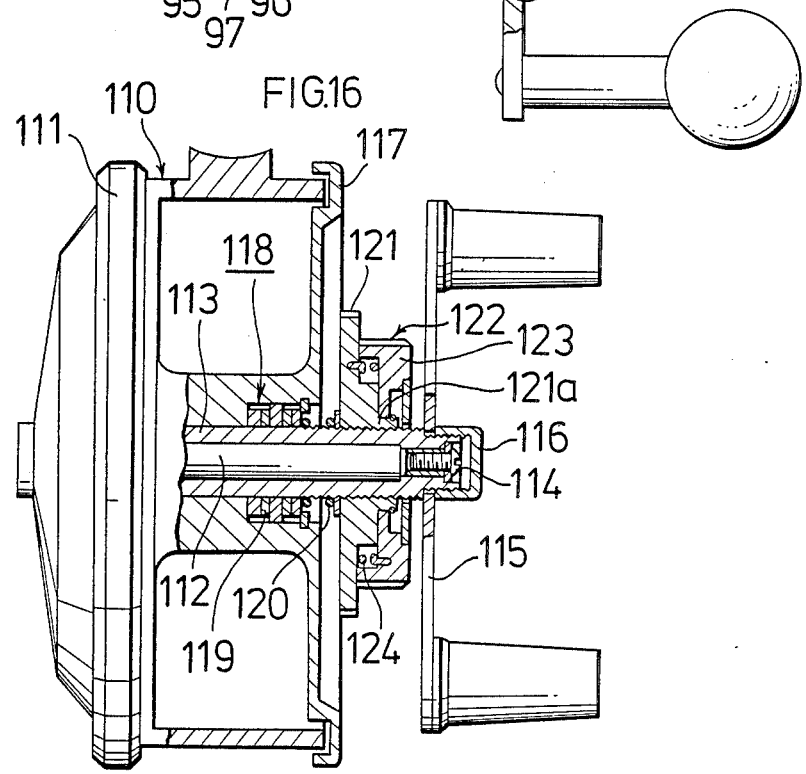
FIG. 16 is a front view, partially cut away, illustrating a fourth embodiment of the present ivention wherein the drag-force measuring apparatus is applied to a single bearing type reel.

Referring now to FIG. 16, which illustrates a fourth embodiment of the present invention, the drag-force measuring apparatus is applied to a single bearing type reel, wherein the numeral 110 designates a reel frame body; one end of shaft 112 is coaxially fixed to the center of a side plate 111; and the other end of shaft 112 protrudes beyond the normally open side of reel frame body 110. A hollow driving shaft 113 is rotatably carried on shaft 112 and is secured to said shaft 112, against accidental removal by a machine screw 114. A handle 115 is fastened to the outer end of driving shaft 113, which protrudes beyond reel frame body, by a cap nut 116. A spool 117 is axially so supported on driving shaft 113 on the inside of reel frame body 110 as to be relatively rotatable. A drag device 118 by which spool 117 and driving shaft 113 are frictionally linked to each other in a slip-rotatable manner is incorporated in spool 117.

Drag device 118 consists of: a group of washers 119 for frictionally connecting spool 117 to driving shaft 113; a drag-force adjusting spring 120 for imparting a pressing force to such washers 119; and a drag-force adjusting knob 121 which is designed for the adjustment of spring pressure and is threadedly engaged to driving shaft 113. Knob 121 is mounted with a drag-force measuring mechanism 122, which latter is composed of a drag-force measuring lug 123 rotatably mounted on a boss 121a projecting from the center of the end surface of knob 121 and of a measuring torsion spring 124, located between lug 123 and knob 121, for producing torque equivalent to the drag-force adjusted by the drag device. Lug 123 and knob 121 are individually formed with indicating marks and display graduations respectively which are not illustrated but are similar to those shown in FIG. 12.

In this presently described embodiment, when measuring the drag-force of the drag device 118 which is adjusted by manipulating knob 121, lug 123 is turned in the winding direction of torsion spring 124. The rotary torque proportional to the amount of the winding deformation of torsion spring 124 is concomitantly created in lug 123, and this torque increases by degrees. When the rotary torque exceeds the fastening torque of knob 121, the latter begins to rotate freely with lug 123, at which time the numeric value that the indicating mark indicated on the display graduations may be read. This numeric value is the actual drag-force set by the drag device 118. Hence it is possible to accurately know the extent to which the drag-force of the drag device 118 is adjusted. The drag-force can therefore be measured in the single bearing type reel with facility.

Figure 17:
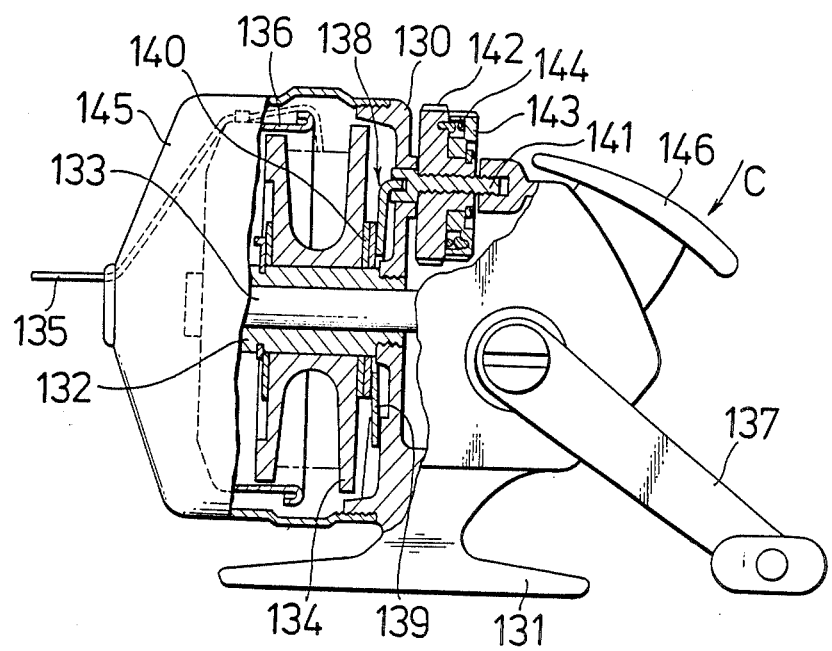
FIG. 17 is a side view, partially cut away, showing a fifth embodiment of the present invention wherein the drag-force measuring apparatus is applied to a closed face type reel.

Referring now to FIG. 17 which shows a fifth embodiment wherein the drag-force measuring apparatus of the present invention is applied to a closed face type reel, the numeral 130 represents a reel body having an installation leg 131 provided at the lower part thereof. A hollow shaft 132 is fixed the the central portion of the front surface of reel body 130 by a screw (not shown). A rotary shaft 133 is disposed within shaft 132 as to be relatively rotatable and exially reciprocable with respect thereto. A spool 134 is rotatably carried on the outer periphery of shaft 132. A rotor 136 whereby a fishing line 135 is wound on spool 134 is fixed to the front protruding end of rotary shaft 133; and the rear end of shaft 133 is linked to a conventional gear mechanism and reciporcating mechanism (not shown) which are accommodated in a rear compartment of reel body 130. Rotary operation is effected by use of a handle 137 rotatably supported on reel body 130. A drag device 138 is disposed on the handle side of spool 134. Drag device 138 is composed of: a damping plate 139; a friction plate 140 interposed between plate 139 and the side surface of spool 134; a damping force (drag-force) adjusting screw rod 141 which is so supported on reel body 130 as to be movable in a direction parallel with the axis of rotary shaft 133, having one end linked to damping plate 139; and a drag-force adjusting knob 142, threadedly engaged to screw rod 141, for advancing the latter towards, and retreating the same from, plate 139. A measuring lug 143 which constitutes a drag-force measuring mechanism is rotatably mounted on a central boss 142a of drag-force adjusting knob 142. Between measuring lug 143 and drag-force adjusting knob 142 there is provided a drag-force measuring torsion spring 144 for producing the torque in lug 143 which corresponds to the fastening force of knob 142.

The numeral 145 indicated a cove attached to the front portion of reel body 130 in such way that it covers spool 134 and the rotor 136. A push button 146 is provided with reel body 130. Upon pushing of button 146 in the direction indicated by an arrow C in FIG. 17, rotor 136 is moved proximate to the inner surface of the cover 145, thereby regulating fishing line 135. Rotor 136 is simultaneously arrested, and the pressing force acting on push button 145 is then eliminated, whereby rotor 136 is in a free state.

In the thus constructed closed face type reel, when measuring the drag-force of drag device 13 which is adjusted by drag-force adjusting knob 142, measuring lug 143 is turned in the winding direction of torsion spring 144. When the resultant torque created in lug 143 is greater than the fastening torque of knob 142, knob 142 and lug 143 enter into joint rotation. An angle of relative displacement between lug 143 and knob 142 at the time of effecting such joint-rotation is indicated on display graduations by an indicating mark as shown in FIG. 12; and the drag-force set by drag device 138 is numerically displayed. Accordingly, the actual drag-force can be measured in the closed face type reel.

Figure 18:
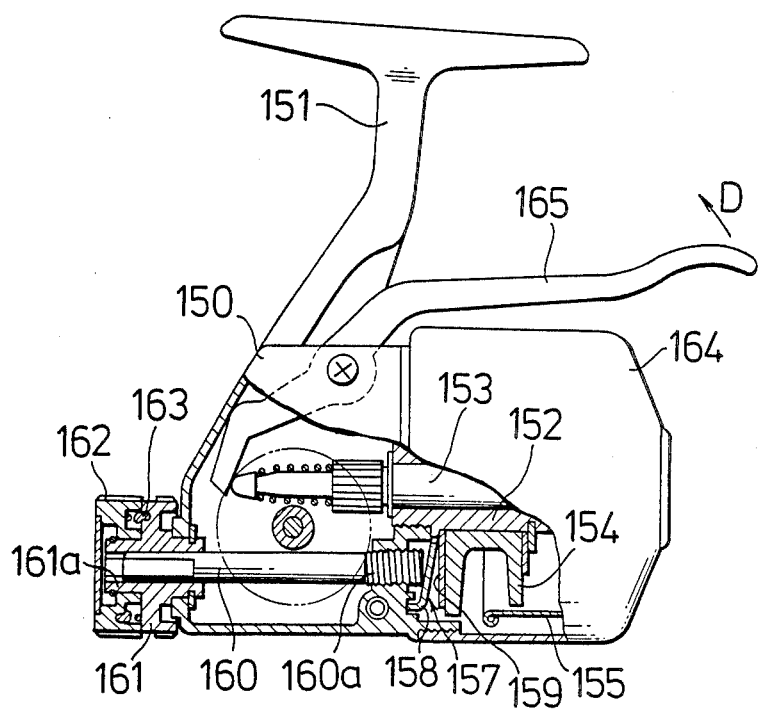
FIG. 18 is a side view showing a sixth embodiment of the present invention wherein the drag-force measuring appartus is applied to a closed face type reel.

Referring now to FIG. 18, a sixth embodiment incorporating drag-force measuring apparatus of the present invention is shown as applied to another closed face type reel. Therein, numeral 150 represents a reel body having an installation leg 151 provided in the upper portion thereof. A hollow shaft 152 is secured to the center of the front surface of reel body 150 with a screw (not shown). A rotary shaft 153 is so retained in shaft 152 as to be relatively rotatable and axially reciprocable with respect thereto. A spool 154 is rotatably mounted on the outer periphery of shaft 152; a rotor 155 whereby the fishing line is wound on spool 154 is fixed to the forward protruding end of rotary shaft 153; and the rearward extending end of said rotary shaft 153 is linked to a conventional gear mechanism and reciporcating mechanism (not shown) which are accommodated in a rear compartment of reel body 150. In this construction, rotary operation is performed by means of a handle (not shown) which is supported for rotation in reel body 150. A drag device 157 is incorporated in the side surface, disposed on the side of the handle, of spool 154, and is comprised of: a damping plate 158; a friction plate 159 interposed between plate 158 and the side surface of spool 154; a damping force (drag-force) adjusting rod 160 disposed in reel body in axial parallel relation with rotary shaft 153; said rod 160 having one end provided with a threaded portion 160a which is screwed in reel body so as to confront plate 158 and with the other end of said rod 160 projecting outwardly from the rear portion of reel body 150; and a drag-force adjusting knob 161 which receives the outer projecting portion of adjusting rod 160 in such a manner that said portion is relatively nonrotatable but axially slideable knob 161 being rotatably mounted to the rear portion of reel body 150. A measuring lug 162 which constitutes a drag-force measuring mechanism is rotatably attached to a central boss 161a of drag-force adjusting knob 161. Between measuring lug 162 and drag-force adjusting knob 161 there is provided a drag-force measuring torsion spring 163 for creating torque in said lug which is proportional to the fastening force of knob 161.

The numeral 164 designates a cover attached to the front portion of reel body 150 in covering relation to spool 154 and rotor 155. The numeral 165 indicated a lever which is rotatably mounted on reel body 150. Upon movement of lever 165 in the direction indicated by arrow D in FIG. 18, rotor 155 is brought close to the inner surface of cover 164, thereby regulating the fishing line, and said rotor 155 is concurrently arrested. Immediately upon releasing lever 165, rotor 155 returns to a free state. In the case of measuring the drag-force set by the drag deivce 157 in this immediately above-described embodiment measuring lug 162 is rotationally operated in the same manner as that of FIG. 17.

FIGS. 19 to 22, inclusive show a seventh embodiment of the drag-force measuring apparatus of the present invention wherein a pressure sensor is utilized as the measuring means.

In said Figures, the same components as those illustrated in FIG. 11 are indicated by the same reference characters and the description therefor is omitted. In this embodiment, the drag-force is measure by using a pressure sensor instead of a measuring torsion spring.

Figure 20:
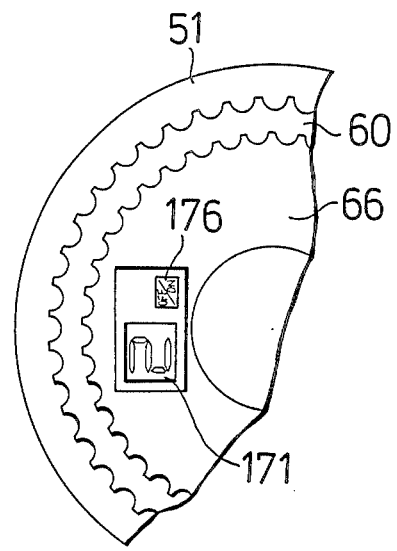
FIG. 20 is a partial end view of the embodiment illustrated in FIG. 19.
Figure 21:
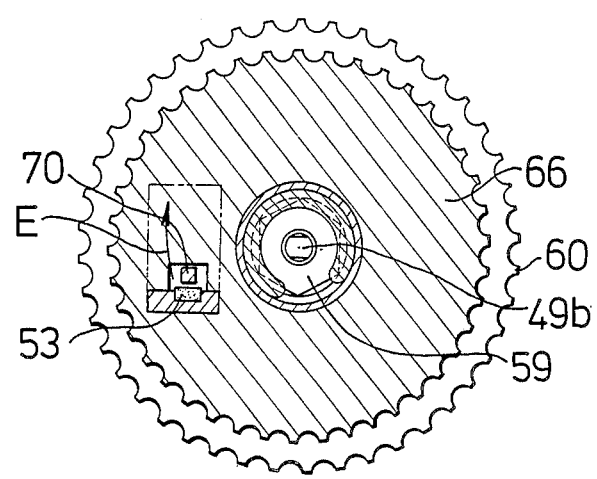
FIG. 21 is a transverse sectional view taken on the line XXI—XXI of FIG. 19.

A pressure sensor 170 suitable for measuring the drag-force is provided in a drag-force measuring lug 66 which is rotatably fitted to a boss 60a of an operating knob 60 when turning lug 66, as illustrated in FIG. 16, in the fastening direction of operating knob 60. This pressure-contactual force is converted into electric energy which is to be outputted. In the above-mentioned lug 66, there is provided on the outer end surface thereof a display unit 171 including a battery power supply and a drag-force arithmetic display dircuit is, as depicted in FIG. 20. The numeral 176 designates a power supply switch provided on the end surface of lug 66.

Figure 22:
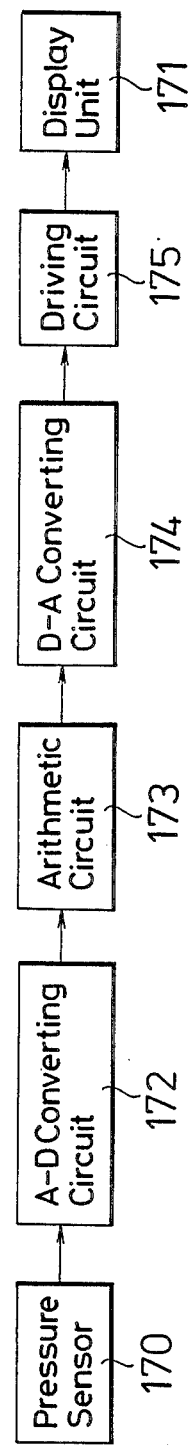
FIG. 22 is a block diagram of the arithmetic display circuit of the embodiment shown in FIG. 19.
Figure 19:
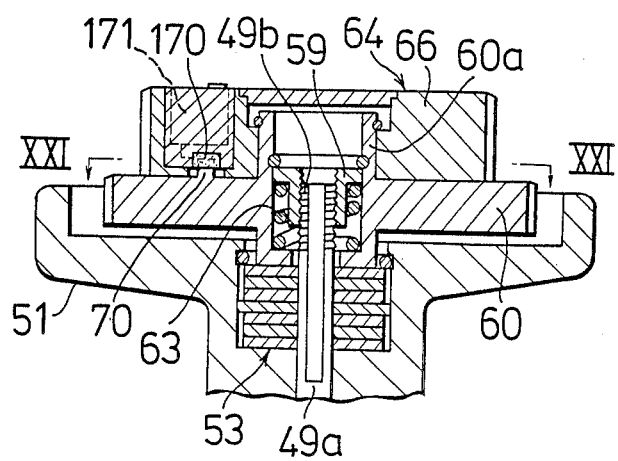
FIG. 19 is a transverse sectional view of a seventh embodiment of a drag-force measuring apparatus which is a pressure sensor.

FIG. 22 is a block diagram showing a drag-force arithmetic display circuit as incorporated in the embodiment shown in FIG. 19. Numeral 172 represents an A/D converting circuit for converting an analog signal outputted from pressure sensor 170 into a digital quantity; 173 designates an arithmetic circuit for computing the drag-force on the basis of the digital signal which has already be subjected to A/D conversion; 174 indicates a D/A converting circuit for converting the output of the arithmetic result into an analog quantity; and 175 designates a display unit driving circuit which is responsive to the output signal of the D/A converting circuit 164. The display unit 171 is driven by the driving circuit 175 whereby the drag-force is numerically displayed.

As for the thus constituted drag-force measuring apparatus, when measuring the actual drag-force of drag device 52 which is adjusted by mainpulating operating knob 60, the power supply switch 176 is at first turned to the ON-side, and the rotary force working in the direction indicated by the arrow E in FIG. 22 is imparted to lug 66 while grasping the same with the fingers. By this step, pressure sensor 170 comes into pressure-engagement with protrusion 70, and a voltage proportional to the force of the prssure is thereby generated in pressure sensor 170. The thus generated voltage is converted into the digital quantity by means of the A/D converting circuit 172 and is then outputted to the arithmetic circuit 173, in which latter ther is effected such an arithmetic operation as to convert the value of the voltage generated in sensor 170 into a drag-force. The arithmetic result is outputted to D/A converting circuit 174, where it is converted into the analog signal (voltage) through the driving circuit 175 to the display unit 171, whereby the output signal of sensor 170 is numerically displayed.

On the other hand, when the rotary torque exerted on lug 66 exceeds the fastening torque adjusted by operating knob 60, the operating knob 60 is rotated together with the lug 66 in the direction of the arrow D through the intermediary of protrusion 70 with which sensor 170 come into pressure-exerting engagement. The output signal corresponding to the pressure acting on pressure sensor 170 at that time is displayed through the respective circuits of FIG. 22 on display unit 171. The thus displayed output signal is therefore the numeric value of actual drag-force imparted to the spool 51 by drag device 53. In other words, the numeric value "2" displayed on display unit 171 is the drag-force which is actually set by drag device 53. This value can thus be comfirmed on the basis of the actual measurement. It is feasible to obtain the same effects as those of the previous embodiment of FIG. 11 as well as to measure accurately the drag-force in this particular embodiment.

Figure 23:
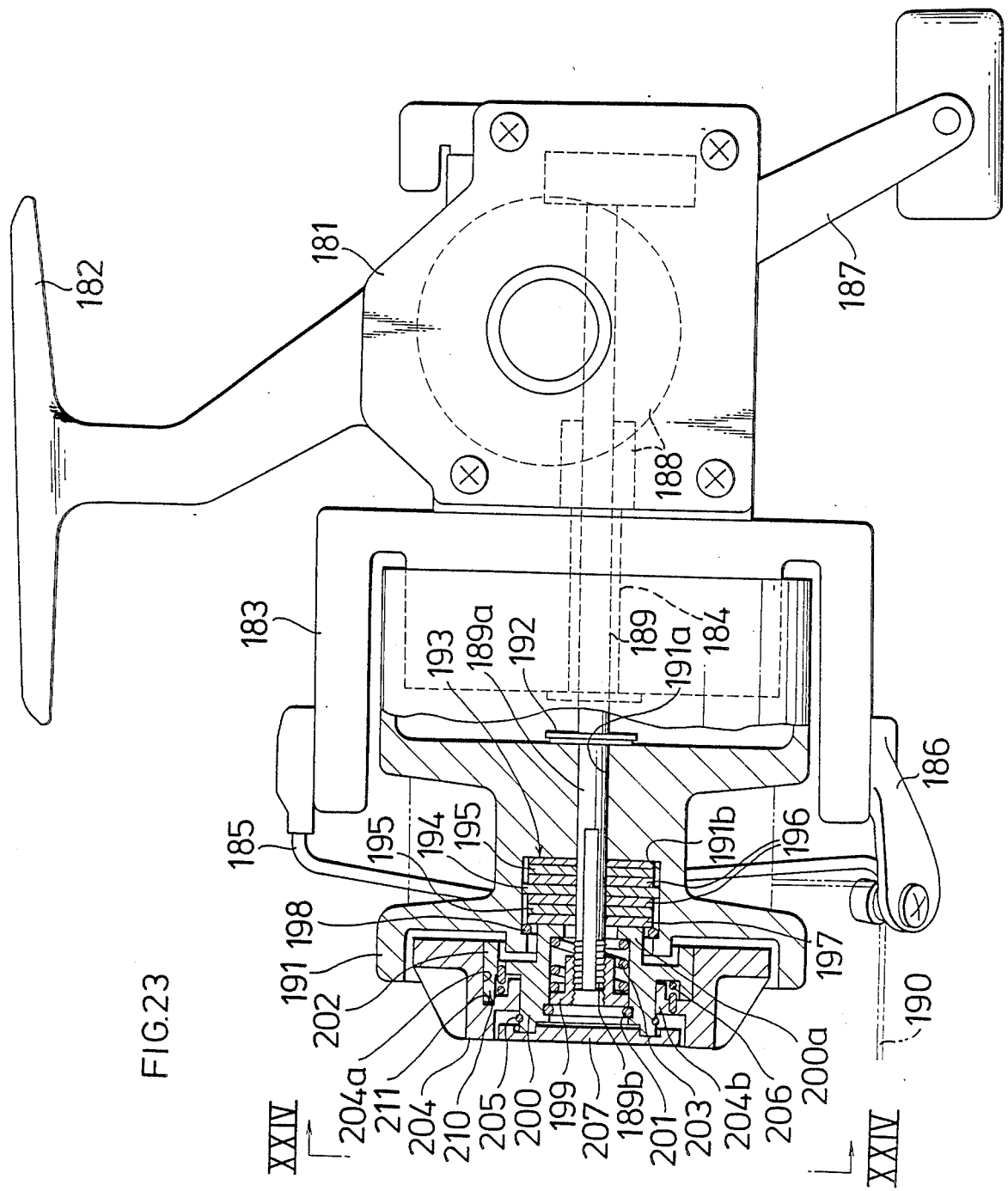
FIG. 23 is a side view, in partial section, of an eighth embodiment of the present invention wherein the drag-force measuring apparatus is applied to a spinning reel.
Figure 25:
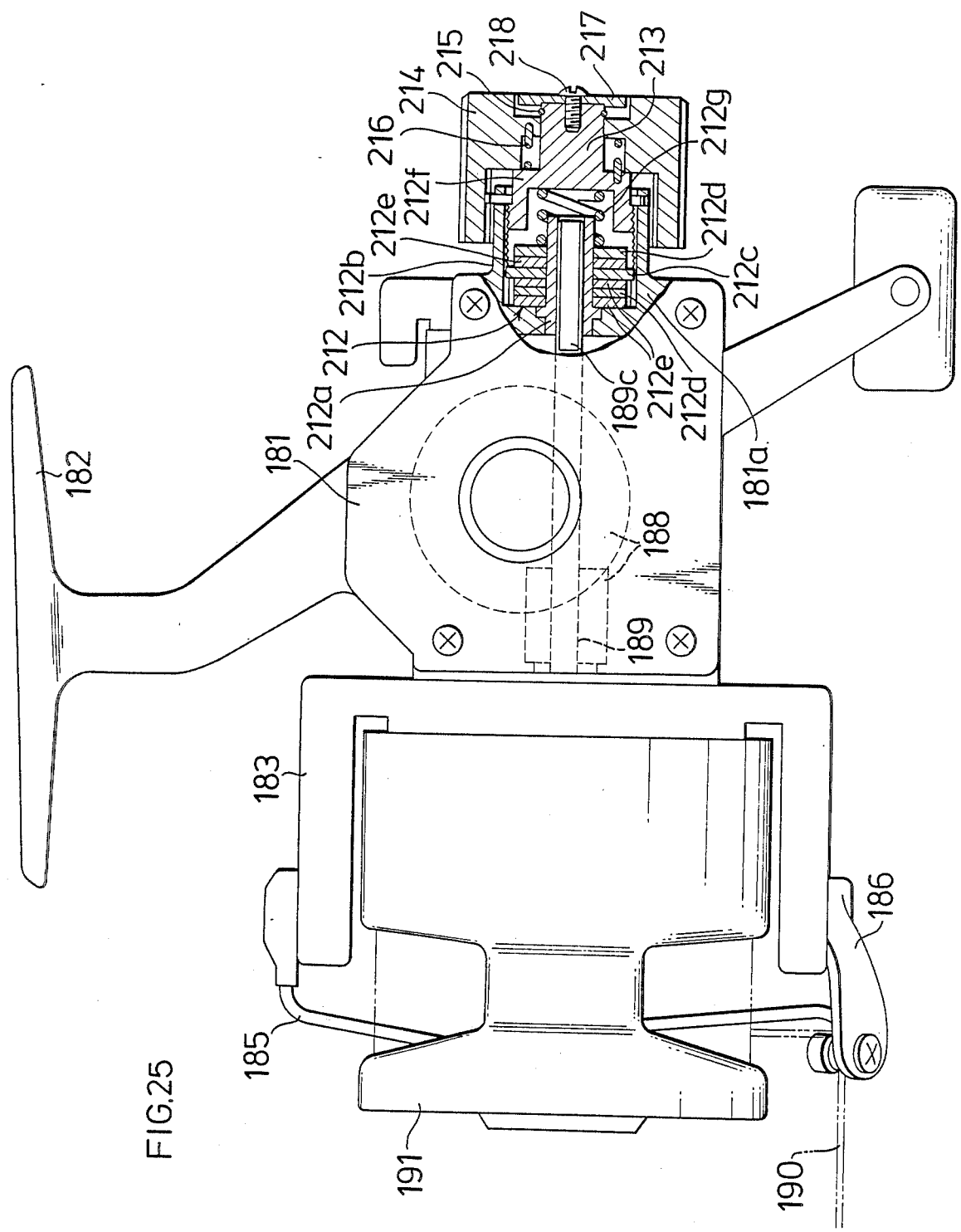
FIG. 25 is a side view, in partial section, of a ninth embodiment of the present invention wherein the drag-force measuring apparatus is applied to a rear type spinning reel.

Referring now to FIGS. 23 and 25, illustrating an eighth embodiment where the drag-force measuring apparatus of the present invention is applied to a spinning reel, wherein the numeral 181 denotes a reel body including an installation leg 182; 183 designates a customary rotor which is so mounted to the front portion of reel body 181 as to be rotatable by means of a supporting shaft 184; 185 represents a bail attached through an arm lever 186 to rotor 183; and 187 indicates a handle secured to reel body 181. Handle 187 and shaft 184 are linked together by a conventional gear train mechanism 188 which is provided n reel body 181. Rotor 183 and bail 185 are rotatable in the line winding direction by turning handle 187. The numeral 189 designates a spool shaft concentric with supporting shaft 184 of rotor 183 and being supported on reel body 181 in such a way that spool shaft 189 is nonrotatable but is axially reciprocable with relation thereto. A spool 191 having a fishing line 190 wound thereon is attached to a projecting end portion 189a of shaft 189 is disposed on the side of rotor 183. Shaft portion 189a is inserted into a central bore 191a, with spool 191 and spool shaft 189 becoming concentric. Movement towards rotor 183 is restricted by a stop member 192 fixed to shaft portion 189a. A drag device 193 for providing the drag-force to spool 191 is disposed within a recess of bore 191b formed on the front surface of spool 191 and which accepts the insertion of spool shaft 191.

Drag device 193 is comprised of: a first drag washer 194 which is connected in a relatively nonrotatable manner to the inner peripheral surface of bore 191b concentric with central shaft bore 191a and is further disposed on the outer periphery of spool shaft 189 in a relatively rotatable manner; a plurality of second drag washers 195 which are mounted on the outer periphery of spool shaft 189 in a relatively nonrotatable manner and are in a free state with respect to the inner periphery of bore 191b; a plurality of lining washers 196 interposed between the first and second drag washers 194, 185 and between the second drag washers 195 and the bottom surface of bore 191b; and a receiving washer 197 superimposed on the second drag washer 195 and positioned at the forward or open end of bore 191b. A group of these washers are held against removal by means of a snap ring 198 engaged in inner periphery of the forward end portion of bore 191b. External threading 189b is formed on the outer periphery of the projecting end portion 189a spool shaft 189 which extends outwardly from bore 191b. A drag-force adjusting nut 199 is threadedly engaged to threading 189b. A cylindrical member 200 for pressing the laminated washers is spline-fitted to the outer periphery of adjusting nut 199 so that member 200 is relatively axially movable. Adjusting nut 199 is restrained by a snap ring 201 against removal outwardly from member 200 which projects toward cylindrical bore 191b and is brought into pressure-contact with receiving washer 197. Between the bottom surface of a portion 200a of member 200 and adjusting nut 199 is spanned a compression spring 203 for adjusting the drag-force. Member 200 includes a cylindrical element 202 having a large diameter which is so shaped as to be concentric, and integral, with the outer periphery thereof. The outer peripheries of cylindrical element 202 and member 200 are received in, and accept a cylindrical bore 204a and a boss 204b of a drag-force adjusting/measuring lug 204, respectively, which are relatively axially rotatable. Cylindrical bore 204a and boss 294b are held against displacement by a snap ring 205 engaging the outer periphery of member 200. Within a spacing formed between cylindrical element 202 of member 200 and member 204a of lug 204 there is provided a measuring torsion spring 206 for producing the torque in lug 204 which is equivalent to the drag-force set by drag device 193. The ends of torsion spring 206 are fixed to the pressing member 200 and to lug 204. Numeral 207 represents a cover member attached to member 200 so as to block the front surface opening thereof. Display graduations 208a, 208b for displaying the actually measured value of drag-force set by drag device 193 are formed on the front surface peripheral edge of cover member 207 with a phasic difference of 180°. On the front surface of lug 206 are formed indicating marks 209a, 209b presented vis a vis display graduations 208a,208b. Numeral 210 denotes a protrusion provided on the edge of one end of cylindrical element 202, and being received in a corresponding arcuate groove 211 chased in lug 204. Protrusion 210 and groove 211 cooperate to restrict the rotational operating angle of lug 204 within the scope of display graduations 208a, 208b and further to prescribe the position to which lug 204 will be returned by dint of torsion spring 206 so that each of the indicating marks 209a, 209b indicates the value "0" on the display graduations 208a, 208b.

The operations of this embodiment in which above-described construction is employed is explained as follows:

Lug 204 is seized by, and tightened with, the fingers or turned in the slackening direction in the case of adjusting the drag-force of drag device 193. Then, pressing member 200 connected through the intermediary of torsion spring 206 is rotated in the same direction, and at the same time adjusting nut 199, which is spline-fitted to member 200, turns and moves in accordance with a screw lead in the axial direction of spool shaft 189. Thus, the degree of compression of spring 203 is varied. Spring pressure acting through pressing member 200 on the laminated washers is then changed, with such change being concomitant with the foregoing variation. Moreover, there is a resultant change in the frictional connecting force between the first and second drag washers 194, 195 through means of lining washer 196, whereby the frictional connecting force between spool shaft 189 and spool 191, viz., the drag-force relative to spool 191, is adjusted.

The description will now be focused on the measurement/display of the drag-force. In this case, lug 204 is grasped with fingers and is then turned in the direction indicated by arrow F of FIG. 24, whereupon, drag-force measuring torsion spring 206 is elastically deformed in the winding direction. In consequence, the rotary torque applied to lug 20 gradually increases. The rotary torque generated by virtue of the elastic deformation of torsion spring 206 is slightly greater than the fastening torque caused by adjusting nut 199 of drag device 193, at which time pressing member 200 is rotated together with lug 204 in the direction of arrow F. Followed by the rotary operation of lug 204, pressing member 200 makes a free-rotation. At this time, the value that each of the indicating marks 209a, 209b indicates on the display graduations 208a, 208b may be read. Hence, this value is the drag-force which is, in effect, adjusted by drag device 193. The value of the drag-force is thus obtained.

A graph showing the relationship between the torque of the lug used for the measuring operation and the drag-force, on the basis of the actually measured value in this embodiment, is identical with that of FIG. 4. As is apparent from the graph the line formed by the numeric value indicating the drag-force and the torque of lug 204 roughly assumes linearity.

It is therefore possible to accurately recognize whether the set drag-force is suited to the fishing line 190 and to the fishing conditions or not by observing the numeric value specified by each of the indicating marks 209a, 209b on the display graduations. This implies that if the fisherman uses, for instance, a six pound line, lug 204 may be adjusted so that the drag-force is set to the numeric value "3" on the graduations. By virtue of this arrangement, even beginners in fishing are able to set the adequate drag-force, and it is further feasible to prevent the occurrence of such difficulties as line severance due to inadequate setting of the drag-force. In as much as the properties of drag device 193 can be confirmed on the basis of the actual measurement, the abrasion (lifetime) of the drag washers or the like can substantially exactly determined, and the maintenance of the drag device can be further facilitated. Reliability is also improved. Since lug 204 serves for the measurement/display of the drag-force as well as for the adjustment thereof, its mechanism can be simplified, and at the same time the operability both in adjustment of the drag-force and in measurement thereof is enhanced. If lug 204 is rotationally operated in the measuring direction of the drag-force, the adjustment thereof can be concurrently made.

Figure 26:
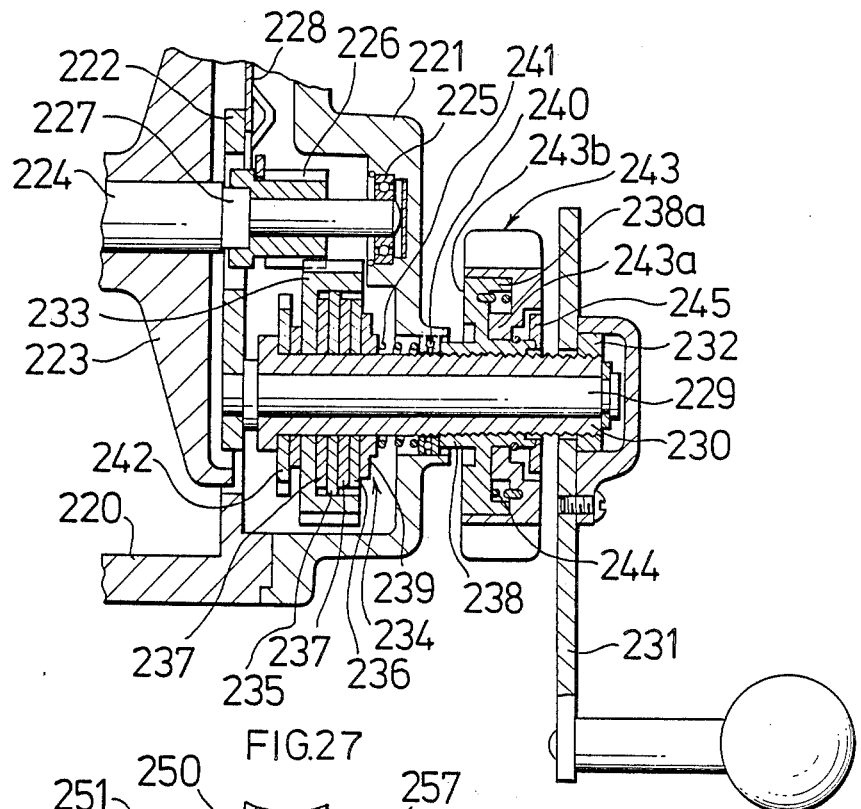
FIG. 26 is a fragmentary sectional view showing a tenth embodiment of the present invention wherein the drag-force measuring apparatus is applied to a double bearing type reel.

Referring now to FIG. 26, there is shown a ninth embodiment wherein the drag-force measuring apparatus of the present invention is applied to a spinning reel equipped with the drag device at the rear end thereof. The same components as those in FIG. 23 are indicated with the same reference characters and the description thereof is therefore omitted. In the following description emphasis will be placed on the difference between same and the structure shown in FIG. 23.

Figure 24:
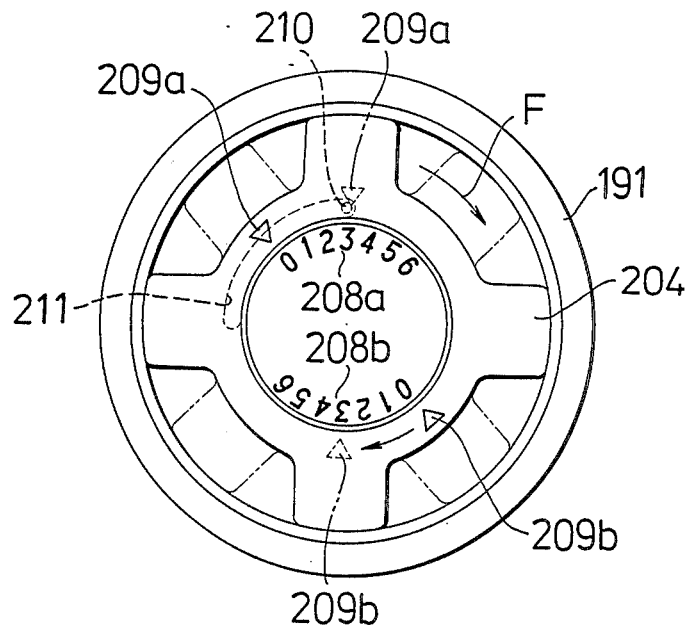
FIG. 24 is an end view taken on the line XXIV—XXIV of FIG. 23.

A drag device 212 is provided at the rear end of reel body 181, and a drag-force measuring mechanism is incorporated in said drag device 212. Drag device 212 consists of: a drag shaft 212a which is rotatably supported on a rear end wall 181a of reel body 181 and is so disposed with respect to a rear end shaft portion 189c of a spool shaft 189 as to be relatively nonrotatable, but is axially slidable. A plurality of first drag washers 212c which are fitted to the outer periphery of drag shaft 212a in a relatively rotatable manner and are engaged with the inner periphery of a cylindrical member 212b in a relatively nonrotatable manner; said member 212b being at the rearward end of reel body 181 as to be coaxial with drag shaft 212a; a plurality of second drag washers 212d which are so fitted to the outer periphery of drag shaft 212a as to be relatively nonrotatably and are freely rotatable with respect to the inner periphery of cylindrical member 212b; a plurality of lining washers 212e interposed between the first and second drag washers, 212c, 212d; a pressing member 212f, held through internal threads formed in the inner periphery of cylindrical member 212b with the result that pressing member is restrained against removal therefrom, for adjustment of the drag-force; and a drag-force adjusting coil spring 212g interposed between pressing member 212f and the group of laminated washers. A lug 214 designed for adjustment/measurement of the drag-force is fitted in a relatively rotatable manner with respect to a pillar member 213 projecting from the center of the end surface to member 212f; said lug 214 being held by a snap ring engaging the outer periphery of pillar member 213 to prevent displacement. A connection between pressing member 212f and lug 214 is made by a measuring torsion spring 216 for yielding the torque equivalent to the drag-force set by drag device 212. A cover member 217 is fastened to the protruding end surface of pillar member 213 with a screw 218. The front surfaces of the cover member 217 and of lug 214 facing the peripheral edge thereof are respectively formed with such display graduations and indicating marks (not shown) as depicted in FIG. 24.

The operation of the foregoing embodiment is as follows: Firstly, lug 215 is turned clockwise for adjusting the drag-force of drag device 212. The rotation of lug 214 is immediately transferred through torsion spring 216 to pressing member 212f, whereby the latter moves axially with the assistance of threading formed on the inner periphery of cylindrical member 212b. Thereby, a spring pressure of spring 212g is developed which presses the group of washers. There is thus changed the frictional connecting force between first and second drag washers 212c, 212d by means of lining washer 212e. As a result, the drag-force working on spool shaft 191 is adjusted.

When effecting the measurement/display on the drag force of drag device 212 which is adjusted by rotationally operating lug 214; the latter which additionally serves to adjust the drag-force is turned clockwise. The rotary torque proportional to the amount of insert-deformation of torsion spring 216 is at once created in lug 214. The thus created torque increased by degrees. When the rotary torque exceeds the fastening torque of pressing member 212f; the latter begins to rotate jointly with lug 214. Consequently, the numeric value that the indicating mark indicates on the display graduations may be read. This value is the actual drag-force set by drag device 212. It is possible to know precisely whether the drag-force set by drag device 212 is suited to the thickness of the employed line and to the fishing conditions or not. The same effects as achieved by the eighth embodiment can also be obtained by the ninth embodiment.

Figure 27:
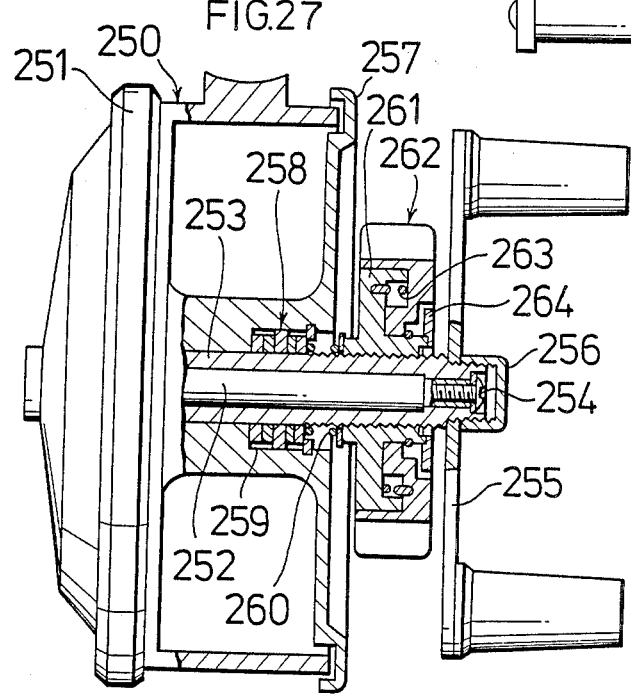
FIG. 27 is a front view, partially cut away, of an eleventh embodiment of the present invention wherein the drag-force measuring apparatus is applied to a single bearing type reel.

FIG. 27 is a sectional view of the principal portion of a tenth embodiment wherein the drag-force measuring apparatus of the present invention is applied to a double bearing type reel. Therein numeral 220 represents a reel frame body; 221 designates a right side plate fixed to the side portion of reel framed body 220; and 222 indicated a set-plate which is so installed on the inside portion of right side plate 221 as to be integral therewith. Numeral 223 designates a spool; one end of a spool shaft 224, which penetrates the axial core of spool 223 and is fixed thereto, is rotatably supported by a bearing 225 on right side plate 221; and on the supporting side, a pinion gear 226 is so mounted on spool shaft 224 as to be relatively rotatable and axially slidable with respect thereto. One end of pinion gear 226 is engageable with, and disengageable from, a clutch 227 provided on spool shaft 224. Numeral 228 represents an operating plate which permits the engagement/disengagement of pinion gear 226 with respect to the clutch 227. Numeral 229 denotes a shaft having one end thereof fixed to set-plate 222 and with the other end penetrating right side plate 221 and protruding therebeyond towards the exterior. A hollow driving shaft 230 is rotatably carried on shaft 229, having one end projecting through the side plate and mounting on such end handle 231 fastened with by a nut 232. A drive gear 233 meshing with pinion gear 226 is attached to driving shaft 230 for relative rotation therewith. Drive gear 233 and driving shaft 230 are frictionally connected to each other by means of a drag device 234.

Drag device 234 is, as illustrated in FIG. 27, composed of: a first drag washer 235 which is relatively rotatable with respect to driving shaft 230 but is relatively nonrotatable with respect to drive gear 233; a second drag washer 236 in nonrotatable relation to driving shaft 230 but being relatively rotatable with respect to drive gear 233; a lining washer 237 interposed between drag washers 235, 236 and drive gear 233; a pressing member 238, threadedly engaged on driving shaft 230, for adjusting the drag-force; and a drag-force adjusting spring 241 interposed between pressing member 238 and drag washer 236 through the intermediary of a pressure plate 239 and a radial bearing 240. Numeral 242 designates a ratchet wheel, secured to driving shaft 30, for preventing reverse rotation of the spool, and a pawl member (not shown) is manually engaged with, and disengaged from, ratchet wheel 242.

Numeral 243 denotes a drag-force measuring adjusting lug which includes a boss 243a is fitted to the outer periphery of pressing member 238 for relative rotation thereto and a cylindrical bore 243b which is likewise engaged to the outer periphery of a large diameter cylindrical member 238a in a relatively rotatable manner with respect thereto. Cylindircal member 238a integrally formed on the outer periphery of pressing member 238, being coaxial therewith. Lug 243 is maintained by a snap ring 244 engaging the outer periphery of pressing member 238 so that the lug is retained against removal. Pressing member 238 is connected to lug 243 by means of a measuring torsion spring 244 for yielding the torque in lug 243 which is equivalent to the drag-force adjusted by drag device 234. Lug 243 and a cover member 245 for blocking the opening formed in pressing member 238 are respectively formed with such display graduations and indicating marks as illustrated FIG. 24.

In the thus constructed double bearing type reel, when measuring the drag-force imparted to spool 223, lug 243 is, for instance turned clockwise. Then torsion spring 244 is elastically deformed in the winding direction, and at the same instant the rotary torque applied to lug 243 gradually increases commensurately with augmentation of the spring pressure. The rotary torque generated in accordance with the amount of elastic deformation of torsion spring 244 is slightly greater than the fastening torque, at which time pressing member 238 begins to rotate with lug 243 in the same direction. Hence, one may read the value that the indicating mark indicates at the immediate point when pressing member 238 is rotatable with lug 243. This value is the actual drag-force set by the drag device 234. It is thus feasible to confirm the drag-force in terms of numeric value.

Even in the double bearing type reel, as described above, it is possible to set the drag-force suitable to the fishing line and to the fishing conditions as in the case of the spinning reel.

Figure 28:
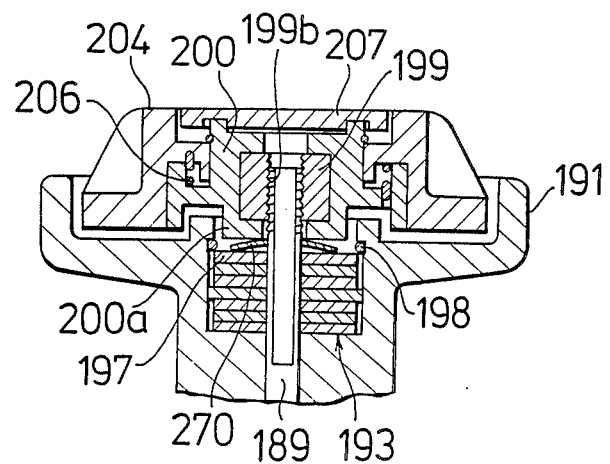
FIG. 28 is a fragmentary sectional view of another form of drag-force measuring device of the type illustrated in FIG. 23.

Referring now to FIG. 28 which shows a tenth embodiment wherein the drag-force measuring apparatus of the present invention is applied to a single bearing type reel. Numeral 250 designates a reel frame body; one end of a shaft 252 is coaxially fixed to the center of side plate 251; and the other end of said shaft 252 extends outwardly from the open side of reel frame body 250. A hollow driving shaft 253 is rotatably mounted on shaft 242 and is at the same time secured thereto by a machine screw 254 to prevent said driving shaft from accidental displacement. A handle 255 is fastened to the protruding end, presented outside reel frame body 250, of driving shaft 253 by a cap nut 256. A spool 257 is axially supported on driving shaft 253 for relative rotation thereto manner, on the inner side of reel frame body 250. In spool 257 there is incorporated a drag device 258 which permits driving shaft 253 and spool 257 to be frictionally connected to each other in a slip-rotatable manner.

Drag device 258 consists of: a group of washers 259 for causing spool 257 and driving shaft 25 to be frictionally connected to each other; a drag-force adjusting spring 260 for imparting the pressure force to said washers; and a drag adjustment pressing member 261 threadedly engaged to driving shaft 253 to be frictionally connected to each other; a drag-force adjusting spring 260 for imparting the pressure force to said washers; and a drag adjustment pressing member 261 theadedly engaged to driving sahft 253 for adjusting the spring pressure. A lug 262 which serves for the adjustment of the drag-force as well as for the measurement thereof is, as in the case of the structure shown in FIG. 27, so engaged to pressing member 261 of the drag device 258 as to be relatively rotatable therewith. A connection between pressing member 261 and lug 262 is effected by a measuring torsion spring 263 for producing the torque equivalent to the drag-force set by the drag device. Lug 262 and a cover member 264 for covering the opening of pressing member 261 are formed with such display graduations and indicating marks (not shown) depicted in FIG. 25.

With this particular embodiment, when measuring the drag-force of drag device 258 which is adjusted by rotation of pressing member 261 through the aid of lug 262, the latter is turned in the winding direction of torsion spring 263. The rotary torque proportional to the amount of winding deformation of torsion spring 263 is concomitantly developed in lug 262. The rotary torque then increases by degrees. When the rotary torque exceeds the fastening torque of pressing member 261; the latter initiates joint rotation with lug 263. At this time, the numeric value that indicating mark indicates on the display graduations may be read. This value is the actual drag-force set by drag device 258. It is, therefore, feasible to exactly recognize the extent to which the drag-force of drag device 258 is adjusted. Even in the single bearing type reel, the measurement of the drag-force can therefore be made.

FIG. 29 is a sectional view of the principal portion, illustrating a variant form of the eighth embodiment of the present invention. The difference from the structure shown in FIG. 23 is that a plate spring 270 is employed as the drag-force adjusting spring member of drag device 193. Plate spring 270 is sandwiched between a pressure-contact member 200a of a pressimg member 200 and a receiving washer 197. A nut 199 which is threadedly engaged to the external threads 189b formed on a spool shaft 189 is fixed to the shaft core of pressing member 200. It is to be noted that the reference characters of the components except the above are the same as those shown in FIG. 24. In the thus arranged variant form, the same functional benefits can be obtained as those obtained from the structure illustrated in FIG. 23. In addition, the instruction of the drag-force adjusting mechanism can be simplified.

What is claimed:

1. In a fishing reel having a reel body, a spool rotatably carried on said reel body, a fishing line wound about said spool, and a drag device operatively engaged to said spool, an apparatus for measuring and adjusting the actual drag force of said spool comprising an adjusting knob rotatably supported on said reel body, means engaging said knob to said drag device whereby through rotation of said knob said drag device will impart to said spool an undetermined drag force, a lug carried on said knob for relative rotation with respect thereto, means interengaging said knob and lug for development of a torque upon relative rotation of said lug corresponding to the drag force actually imparted whereby said knob and lug are jointly rotatable when said torque is exceeded, scalar means corresponding to the angle of relative rotation of said knob and lug, and means for displaying the scalar value representing the actual drag force.

2. The invention defined in claim 1 wherein said means interengaging said knob and lug is resilient.

3. The invention defined in claim 1 wherein said means interengaging said knob and lug is a torsion spring.

4. The invention defined in claim 1 wherein said scalar means comprise graduations provided on said knob and cooperating indicator mark provided on said lug.

5. The invention defined in claim 1 wherein means limiting relative rotation of said knob and lug are provided, said limiting means comprising a protrusion formed on said knob and said lug having an arcuate groove of predetermined degree receiving said protrusion for relative travel of the latter therein.

6. The invention defined in claim 1 wherein said scalar means comprise at least one indicating marker provided on said knob, and said lug having at least one series of graduations cooperating with said at least one indicating marker.

7. The invention defined in claim 1 wherein said scalar means comprises a plate carried on said lug, said plate having at least one arcuate opening provided therein for exposing a portion of said knob, graduations formed on said plate adjacent said opening, and an indicating marker provided on the exposed portion of said knob for visibility through said opening.

8. In a fishing reel of closed face type having a reel body a rotary shaft, a hollow spool shaft carried on rotary shaft, a spool carried said spool shaft, a handle rotatably supported on said reel body, means operatively interconnecting said handle and said rotary shaft, a drag device disposed on the handle side of said spool, a drag force measuring apparatus comprising an adjusting knob engaging said drag device for causing same to impart an undetermined drag force to said spool, a lug mounted on said knob for rotation with respect thereto, means interengaging said knob and lug for developing a torque therebetween equivalent to the actual drag force imparted to said spool, and display means for indicating the developed torque.

* * * * *